United States Patent
Lease et al.

(10) Patent No.: US 10,082,416 B1
(45) Date of Patent: Sep. 25, 2018

(54) LIQUID LEVEL GAUGE WITH INTEGRAL ELECTRONIC DISPLAY

(71) Applicant: Texas LFP, LLC, Dallas, TX (US)

(72) Inventors: Benjamin Neal Lease, Flower Mound, TX (US); Herbert G. Ross, Jr., Argyle, TX (US)

(73) Assignee: Rochester Gauges, Inc., Dallas, TX (US)

( * ) Notice: Subject to any disclaimer, the term of this patent is extended or adjusted under 35 U.S.C. 154(b) by 0 days.

(21) Appl. No.: 15/492,862

(22) Filed: Apr. 20, 2017

(51) Int. Cl.
*G01F 23/38* (2006.01)
*G01F 23/00* (2006.01)
*F17C 11/00* (2006.01)
*F17C 13/02* (2006.01)

(52) U.S. Cl.
CPC ............ *G01F 23/38* (2013.01); *F17C 11/007* (2013.01); *F17C 13/026* (2013.01); *F17C 13/028* (2013.01); *G01F 23/0076* (2013.01); *F17C 2201/0109* (2013.01); *F17C 2205/0323* (2013.01); *F17C 2221/033* (2013.01); *F17C 2221/035* (2013.01); *F17C 2250/0413* (2013.01); *F17C 2250/0417* (2013.01)

(58) Field of Classification Search
CPC .... G01F 23/38; G01F 23/0076; F17C 13/026; F17C 13/028; F17C 11/007; F17C 2221/033; F17C 2221/035; F17C 2201/0109; F17C 2205/0323; F17C 2250/0417; F17C 2250/0413
See application file for complete search history.

(56) References Cited

U.S. PATENT DOCUMENTS

| | | | |
|---|---|---|---|
| 4,553,216 A | 11/1985 | Stevens et al. |
| 4,635,480 A | 1/1987 | Hrncir et al. |
| 4,924,703 A | 5/1990 | White et al. |
| 5,072,615 A | 12/1991 | Nawrocki |
| 5,076,101 A | 12/1991 | Lazure |
| 5,386,736 A | 2/1995 | Spillman, Jr. |

(Continued)

FOREIGN PATENT DOCUMENTS

| | | |
|---|---|---|
| CN | 203443642 U | 2/2014 |
| CN | 205373816 U | 7/2016 |

*Primary Examiner* — Son Le
*Assistant Examiner* — Xin Zhong
(74) *Attorney, Agent, or Firm* — Alvin R. Wirthlin

(57) ABSTRACT

An electronic liquid level gauge assembly includes an electronic display located in a housing connected to a tank. The display has first and second display portions for indicating liquid level condition. A first electronic sensor senses a change in magnetic field of a magnet associated with a liquid level transducer, with magnet rotation being proportional liquid level change. A processor determines a temperature-compensated liquid level condition by correlating the liquid level signal with temperature measurement of the liquid. A temperature-compensated vapor space can also be calculated based on tank information and properties of the liquid. Signals related to the temperature-compensated liquid level and vapor space are sent to the display and wirelessly transmitted to a smart phone or the like for remotely viewing the tank information. The smart phone also includes a special app for sending information, firmware updates, and display configuration data to the electronic gauge assembly.

19 Claims, 10 Drawing Sheets

(56) References Cited

U.S. PATENT DOCUMENTS

| | | |
|---|---|---|
| 5,900,546 A | 5/1999 | Wilkins |
| 5,950,487 A * | 9/1999 | Maresca, Jr. ......... G01F 23/706 250/577 |
| 6,289,728 B1 | 9/2001 | Wilkins |
| 6,615,656 B1 | 9/2003 | Breed et al. |
| 7,219,546 B2 | 5/2007 | Ross, Jr. |
| 7,610,806 B2 | 11/2009 | Skinner |
| 7,819,003 B2 | 10/2010 | Breed et al. |
| 7,978,067 B2 | 7/2011 | Wagner et al. |
| 8,104,341 B2 | 1/2012 | Lagergren et al. |
| 9,304,027 B2 | 4/2016 | Ross, Jr. |
| 2004/0079152 A1* | 4/2004 | Sorenson ................ G01F 23/38 73/313 |
| 2009/0064777 A1* | 3/2009 | Mundo ................... G01F 23/38 73/317 |
| 2012/0123706 A1 | 5/2012 | Armitage et al. |

\* cited by examiner

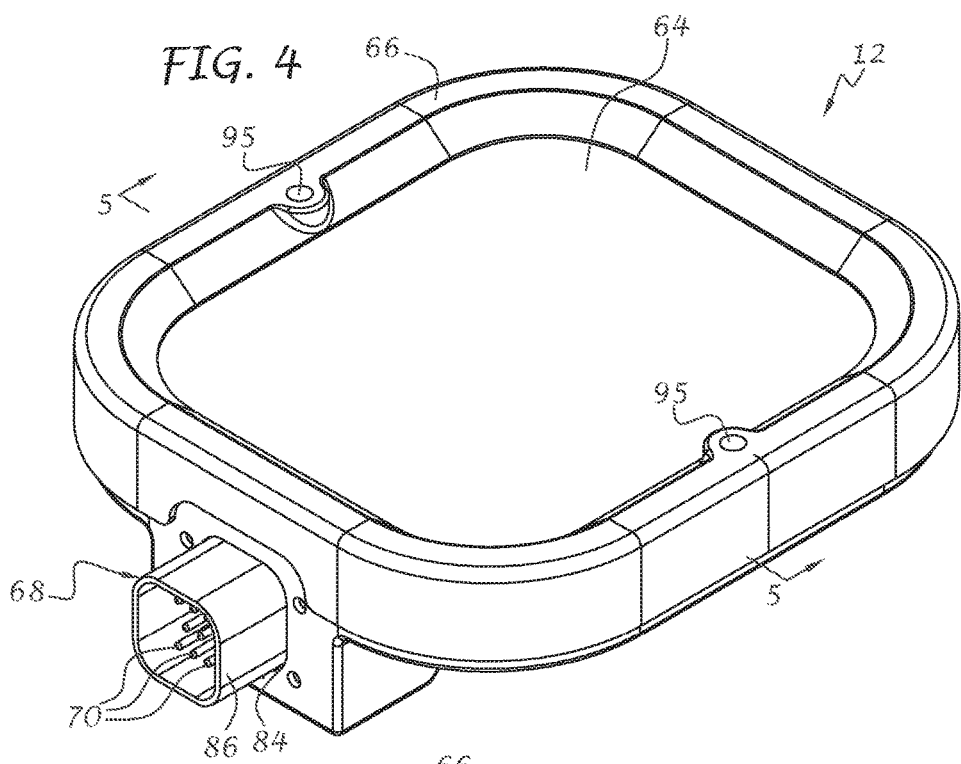
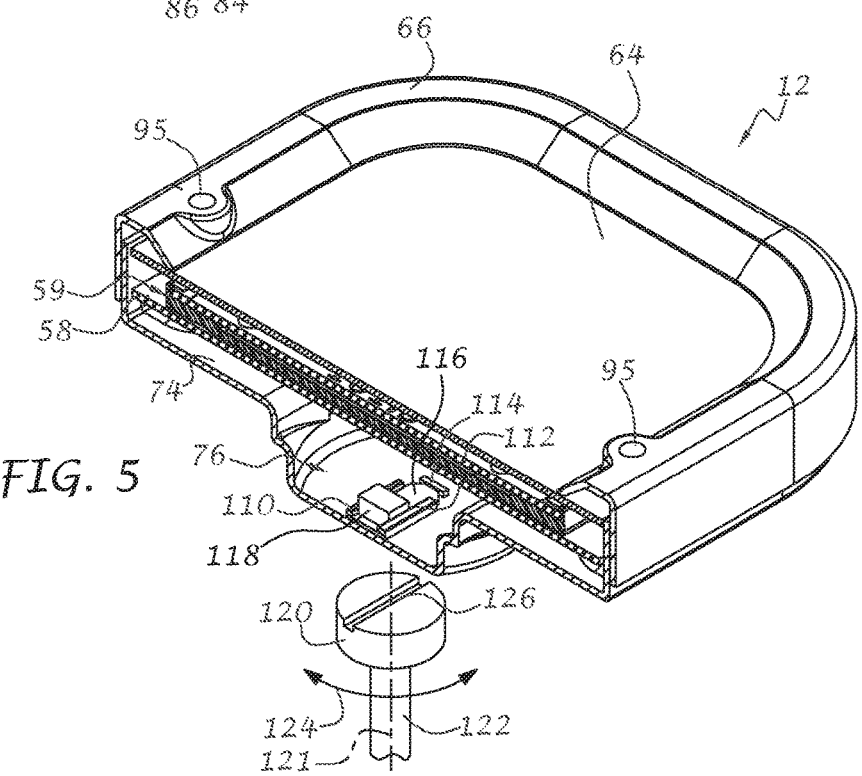

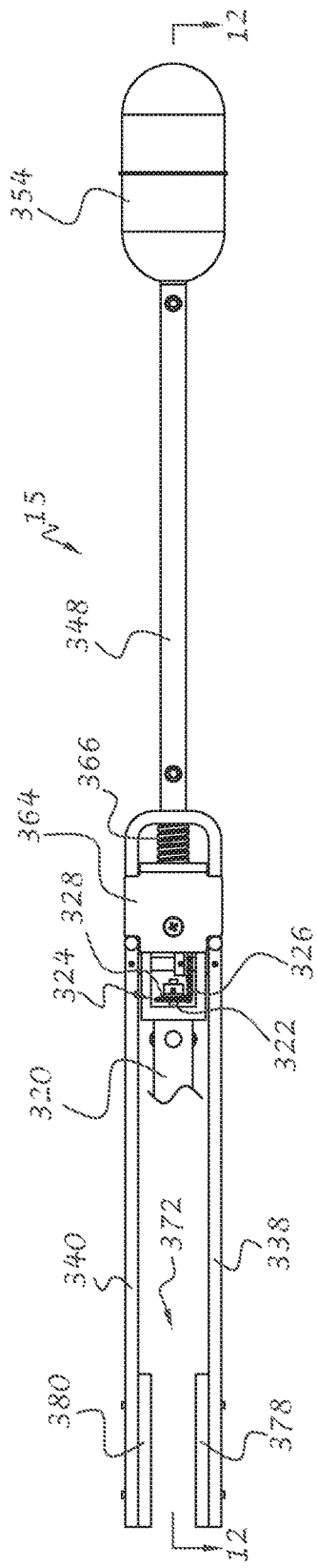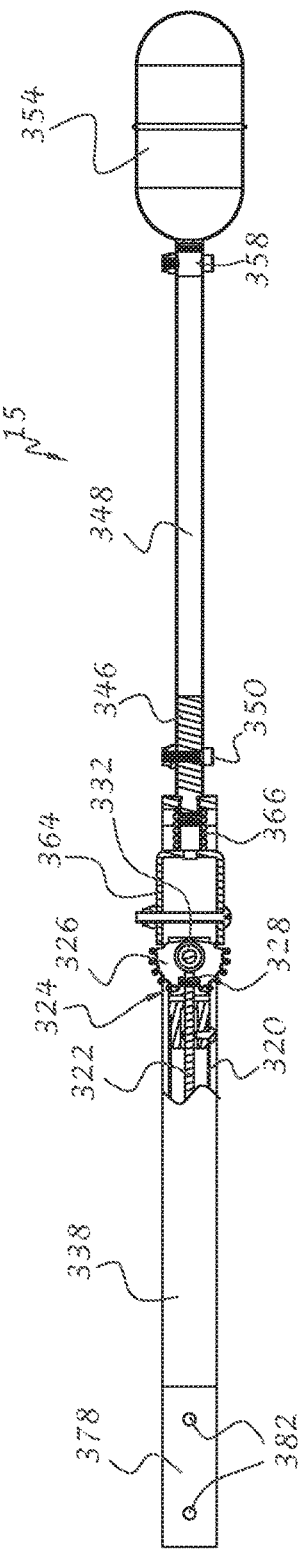
FIG. 11
FIG. 12

LIQUID LEVEL GAUGE WITH INTEGRAL ELECTRONIC DISPLAY

BACKGROUND OF THE INVENTION

Delivery vehicles for pressurized fuel and other liquids, such as liquefied petroleum gas (LPG), propane, butane, and so on, typically include a large holding tank located rearwardly of the cab. A fuel sending unit is typically mounted at the center of the tank above eye level of the observer. The sending unit includes a float that rides on the surface of the liquid. The float is connected to a pivoting float arm which is in turn connected to the lower end of a driven shaft that rotates about its axis in response to float movement. A driving magnet is typically located at the upper end of the driven shaft that magnetically couples with a driven magnet inside the gauge head, which is associated with an indicator, so that rotational movement of the driving magnet in response to float movement induces the driven magnet to rotate a proportional amount and rotate the indicator across a scale associated with the gauge head, to thereby display a liquid level condition of the tank to an observer.

When such fuel gauges are mounted to large storage tanks associated with transportation vehicles, such as propane delivery trucks, the gauge head is typically mounted at the rear center of the tank to minimize errors in reading. However, such a location is usually above the operator's field of view, which makes it hard to accurately read the gauge due to parallax errors that occur when the eyes of an observer are not properly aligned with the indicator and scale.

In addition, such gauges also inconvenience an operator since the liquid level within the tank is not readily apparent unless the vehicle is parked on a level surface and the operator exits the cab and walks to the rear of the vehicle to observe the gauge reading. Even when the gauge reading can be manually observed, it may not be accurate within acceptable limits unless compensation of liquid level or volume is manually calculated based on the specific gravity of the particular liquid within the tank, which can be affected by temperature. Accordingly, an operator must have knowledge of the contents of the tank, its specific gravity at a set temperature, and expansion or contraction of the volume based on changes in specific gravity for a particular fluid at different temperatures. Consequently, obtaining a clear and accurate reading of the volume or level of liquid within such storage tanks can be both a difficult and time-consuming task.

It would therefore be desirous to provide a simple, straight forward solution that would reduce or eliminate parallax reading errors while avoiding high development and manufacturing costs associated with redesigning the gauge head, fuel sending unit and/or tank.

SUMMARY OF THE INVENTION

In accordance with one aspect of the invention, an electronic gauge assembly for indicating liquid level within a tank, the gauge assembly being operatively connectable to a liquid level sensor probe, and comprising a mounting base adapted for connection to the tank, a housing connected to the mounting base, an electronic display located in the housing and having a first display portion for displaying a liquid level condition within the tank, and a first electronic sensor connected to the housing. The first electronic sensor is couplable to the liquid level sensor probe such that a change in the liquid level sensor probe due to a change in liquid level causes a change in electronic state of the first electronic sensor. A processor is in communication with the first electronic sensor and includes means for determining a first liquid level condition within the tank based on the change in state.

In accordance with another aspect of the invention, a second electronic sensor for detecting a temperature of the liquid within the tank is also in communication with the processor. The processor includes means for calculating a second temperature-compensated liquid level condition based on the first liquid level condition and the temperature of the liquid, and sending signals representing the second liquid level condition to the first display portion for displaying the temperature-compensated liquid level condition.

In accordance with yet a further aspect of the invention, a method of measuring and displaying liquid within a tank includes providing an electronic gauge assembly having a processor in communication with a memory, an electronic display, a first sensor for sensing liquid level and a second sensor for sensing temperature of the liquid, determining a liquid level condition of the tank with the first sensor, determining a temperature of the liquid within the tank with the second sensor, calculating, with the processor, a temperature-corrected liquid level condition of the tank by correlating first information stored in the memory related to geometry of the tank and volume of liquid at any given liquid height, and correlating second information stored in the memory related to volume expansion and contraction for a range of temperatures, displaying at least one of temperature-corrected liquid level and temperature-corrected liquid volume on the electronic display, and communicating at least one of the temperature-corrected liquid level and volume wirelessly to a remote device.

Other aspects, objects and advantages of the invention will become apparent upon further study of the following description in conjunction with the attached drawings.

BRIEF DESCRIPTION OF THE DRAWINGS

The following detailed description of the preferred embodiments of the present invention will be best understood when considered in conjunction with the accompanying drawings, wherein like designations denote like elements throughout the drawings, and wherein:

FIG. 4 is an enlarged front isometric view of the electronic gauge assembly in accordance with the invention;

FIG. 5 is a sectional view thereof taken along line 5-5 of FIG. 4;

FIG. 11 is a top plan view of the sensing probe assembly;

FIG. 12 is a side elevational sectional view thereof in taken along line 12-12 of FIG. 11.

It is noted that the drawings are intended to depict only exemplary embodiments of the invention and therefore should not be considered as limiting the scope thereof. It is further noted that the drawings may not be to scale. The invention will now be described in greater detail with reference to the accompanying drawings.

DETAILED DESCRIPTION OF THE INVENTION

Figure 1:
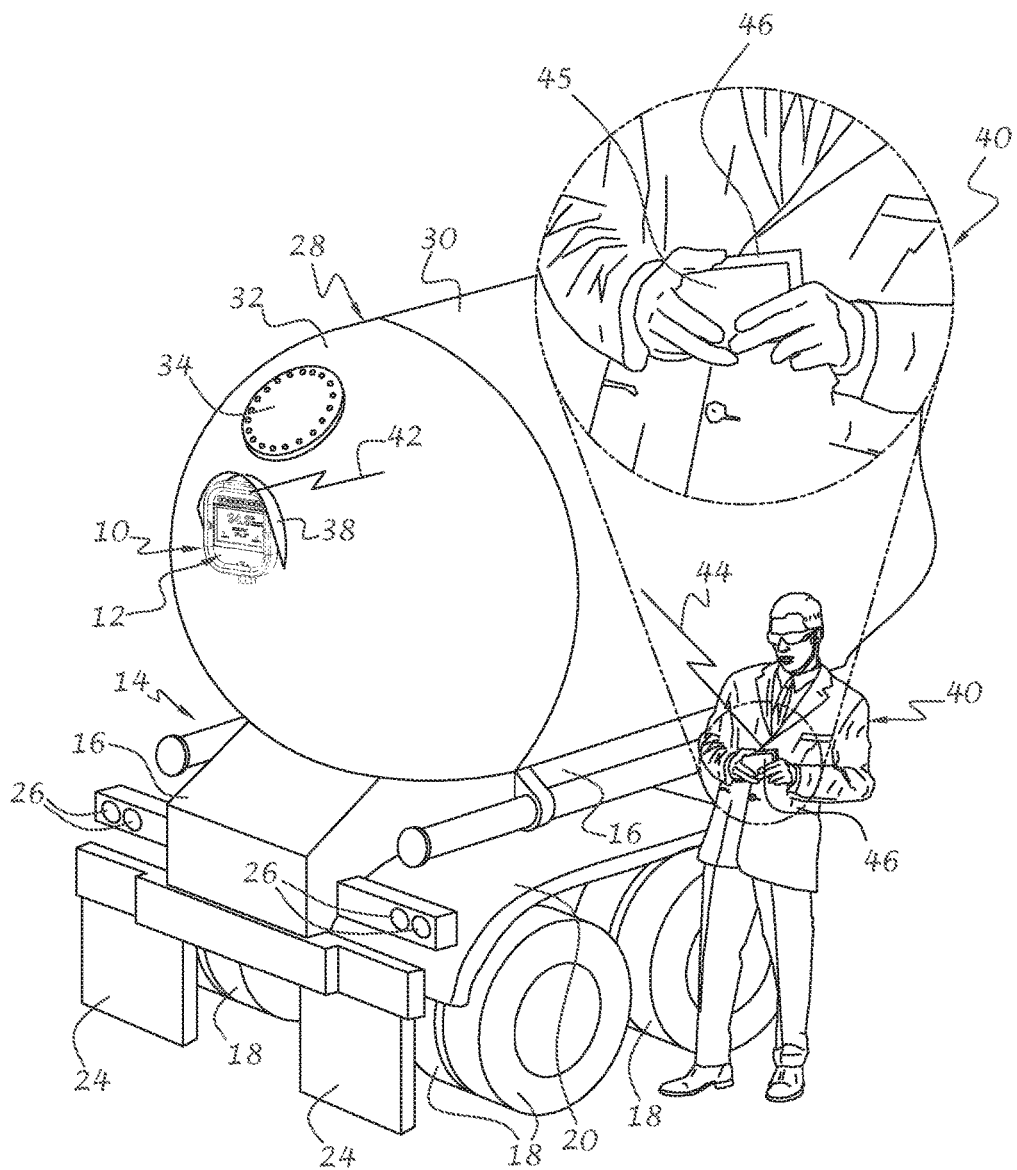
FIG. 1 is a rear elevational view of a liquid level transducer having an electronic gauge assembly in accordance with the invention mounted on a liquid transport vehicle.
Figure 2:
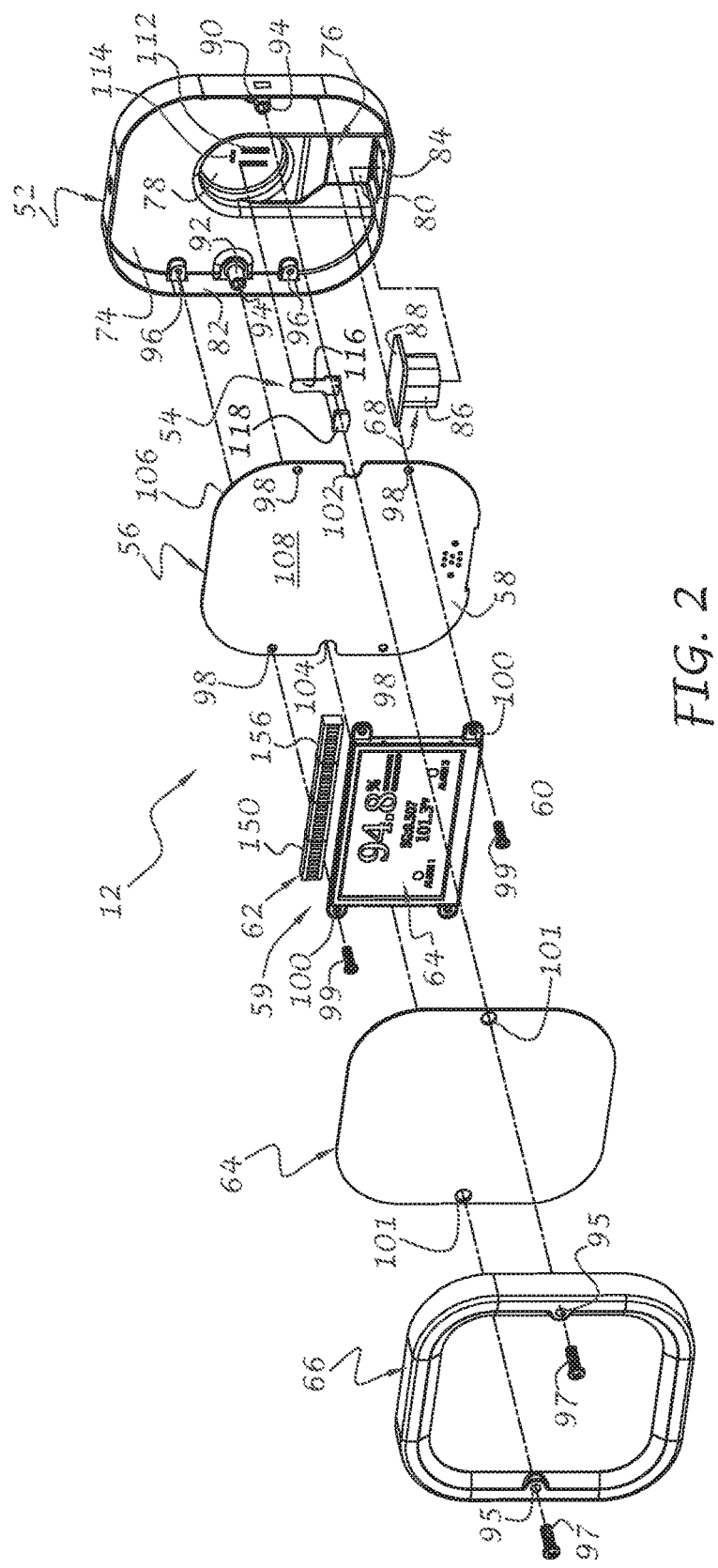
FIG. 2 is a front isometric exploded view of the electronic gauge assembly.

Referring now to the drawings, and to FIGS. 1 and 2 in particular, a liquid level transducer 10 having an electronic gauge assembly 12 with an exemplary attached sensing probe assembly 15 (FIG. 9) in accordance with an exemplary embodiment of the invention is shown connected to a refueling vehicle 14 or the like. The vehicle 14 is only partially represented in FIG. 1 and shows the rearward portion of a bobtail truck or trailer having a frame 16 supported on wheels 18, a wheel guard or fender 20 extending along the frame and partially around the front and rear of the wheels, a rear bumper 22 connected to the frame 14, mud flaps 24 extending downwardly from the bumper 22, tail light assemblies 26 extending laterally from opposite sides of the frame 16, and a holding tank 28 supported on the frame 16. The tank 28 includes a generally cylindrical tank section 30 with a semispherical rear tank section 32. A manway opening (not shown) is sealed by a manway cover 34 located on the rear tank section 32 above the transducer 10 for allowing manual access into the tank 28. A shield 38 for protecting and shading the electronic gauge assembly 12 of the transducer 10 is mounted on the rear tank section 32 above the gauge assembly.

The tank 28 can contain, but is not limited to, liquid propane gas (LPG), methane gas, butane gas, natural gas, GLP, and other liquefied gases or combinations thereof, other cryogenic or non-cryogenic fluids, and so on. The vehicle 12 is intended to carry a large quantity of fuel or other liquid for refilling smaller tanks, such as permanently installed commercial or residential propane tanks, for delivering fuel to a home, vehicle, and other tanks or the like, as is well-known. The tank 26 may have a manway opening (not shown), which is typically formed in the rear portion 30 of the tank 26, and a manway cover 34 that extends over and seals the opening 32 through a series of peripherally located fasteners 36 and one or more seals (not shown) to prevent loss of pressurized gas or liquid when in service. The tank 26 may include one or more manway openings and covers at other locations along the tank, such as when the tank is divided into several sections or segments, as is well known.

Referring to FIG. 1, a user 40 is illustrated standing next to the vehicle 14 and facing away from information displayed on the electronic gauge assembly 12, yet able to receive and view such information on a display 45 associated with a smart device 46, such as a smart phone, tablet, or the like, via wireless communications, such as radio frequency (RF) communications, as schematically represented by communication lines 42, 44 in FIG. 1. The user 40 may be any person associated with the vehicle or tank, such as an operator, inspector, refueling technician, and so on. The readily available information can be viewed anywhere the RF carrier signal can be broadcast, including inside the cab (not shown) of the vehicle 12, or within a broadcast range of the RF transceiver 50 (FIG. 12) of the electronic gauge assembly 12. Accordingly, the user 40 need not walk to the back (or side) of a tank to retrieve vital tank information but is capable of receiving that information anywhere a wireless carrier signal can be transmitted and received by the user's device 46, as will be described in further detail below.

With particular reference to FIGS. 2-5, the electronic gauge assembly 12 preferably includes a rear housing portion 52, a sensor assembly 54 connected to the rear housing portion 52, an electronic assembly 56 (FIG. 2) including a printed circuit board (PCB) 58 with various electronic components (not shown) connected thereto, as will be described in greater detail below, a display assembly 59 includes a first display portion 60 connected to the PCB, a second display portion 62 located above the first display portion 60 and also connected to the PCB 58, a transparent protective lens 64 to protect the display portions, and a front housing portion or bezel 66 connected to the lens 64 and the rear housing portion 52 for enclosing the above-described components. An electrical receptacle 68 is attached to the rear housing portion 52 and includes a plurality of pins 70 (FIG. 4) associated with the electronic assembly 56 for connection with a wiring harness (not shown) associated with the vehicle, tank, system, or machine associated with the tank. The wiring harness (not shown) is connected to a power supply 72 (FIG. 6), such as the power supply of a vehicle, external battery, line power, and so on, for example, for providing electrical power to the electronic assembly 56 and displays 60 and 62. The electronic assembly 56 is also capable of transmitting, via the receptacle 68 and wiring harness, signals to an external display (not shown) indicative of conditions inside the tank 28 (FIG. 1) including temperature, pressure, liquid type, specific gravity, density, liquid level, vapor space, and so on, ambient conditions outside of the tank such as temperature, humidity, atmospheric pressure, vehicle tilt, and so on, as well as other conditions and/or measurements. The external display may be associated with the vehicle, a portable display associated with a tablet 46 (FIG. 1) or other smart device, and so on.

The rear housing 52 includes a rear wall 74 with a depression 76 having first generally circular depression portion 78 for receiving the sensor assembly 54, and a second generally elongate depression portion 80 for accommodating the shape of the receptacle 68. A continuous side wall 82 extends forwardly from the rear wall 74 and includes a lower opening 84 that receives the side wall 86 of the receptacle 68. A bottom wall 88 of the receptacle rests against the side wall 82 of the rear housing 52 and is connected thereto through mechanical fastening, adhesive bonding, ultrasonic welding or any other connection means so that the receptacle 68 stays in place when connecting or connected to a wiring harness (not shown) of the vehicle or system associated with the tank 28. Spaced mounting bosses 90 and 92 extend forwardly from the rear wall 74 of the rear housing 52 and include openings 94. Corresponding openings 95 (FIG. 2) are also formed in the front bezel 66 and openings 101 are formed in the lens 64. Threaded fasteners 97 extend through the openings 95 of the front bezel 66, openings 101 of the lens 64, and the openings 94 of the bosses 90, 92 of the rear housing 52 for securing together the electronic gauge assembly 12. Mounting apertures 96 are also formed in the rear wall 74 that align with corresponding mounting apertures 98 formed in the PCB 58 and mounting apertures 100 formed in the first display portion 60 for mounting the first display portion 60 to the PCB 58 and the rear housing 52 via threaded fasteners 99 (only two shown for clarity in FIG. 2), standoffs, or the like that extend through the apertures 100, 98 and 96, respectively.

The PCB 58 includes side depressions 102 and 104 for receiving the mounting bosses 90, 92 respectively. Various electronic components of the electronic assembly 56 are connected to a rear side 106 of the PCB 58, while the first display portion 60 and second display portion 62 are connected to a front side 108 of the PCB 58 for viewing by an observer through the transparent protective lens 64.

As best shown in FIG. 5, the generally circular depression portion 78 formed in the rear wall 74 of the rear housing 52 has retainers 110, 112, and 114 for holding a sensor PCB 116 of the sensor assembly 54. The sensor assembly 54 also includes a sensor 118 or the like, preferably in the form of a magnetic field sensor, for detecting rotational movement of an actuator 120, preferably comprising a magnet, through the rear wall 74 of the rear housing 52. The magnet 120 is connected to an upper end of a shaft 122 for rotation therewith about a first rotational axis 121 of the shaft 122, as represented by arrows 124, upon a change in liquid level inside the tank, as will be described in greater detail below.

The actuator magnet 120 can have an anomaly 126, shown as a slot for example, so that the magnetic field is non-uniform. Other anomalies can include thicker and thinner magnetic sections, sloped magnetic surfaces, rectangular-shaped magnets, magnets having different polarity signatures, one or more magnets that are offset from the first rotational axis 121 and so on. It will be understood that the anomaly may be removed when certain types of magnetic sensors are used.

By way of example, magnetic sensors can include, but are not limited to, one or more solid state magnetic flux field sensors, Hall effect sensors, magnetoresistive (MR) sensors, anisotropic MR (AMR) sensors, giant magnetoresistance (GMR) sensors, solid state Micro-Electro-Mechanical Systems (MEMS), magnetic switches, as well as nonmagnetic sensing technologies such as proximity detectors using capacitance, optical, or other measurement technologies, and so on. With the use of the above sensors, it may not be necessary to have the sensor in alignment with the central axis of rotation of the magnet, or a plurality of sensors, since a single Hall effect IC may be sufficient to determine the position of the magnet and thus the level of liquid within the container.

It will be appreciated that the invention is not limited to actuators and sensors for generating and sensing magnetic fields or changes in magnetic fields during rotation of the actuator 120, but may include other types of actuators and sensors for determining liquid level or other tank conditions. For example, the sensor 118 can be in the form of one or more optical sensors for use with optical actuators, such as LED's or other light source, as well as other contactless actuator/sensor arrangements to remotely change the electrical state of the sensor to thereby generate a liquid level signal in response to rotational movement of the shaft 122. In the event that optical actuators/sensors are used, the housing can be formed of a material that is translucent or transparent to the wavelength of the light source so that the sensor can readily detect movement of the light source as the liquid level in the container rises and falls.

Figure 3:
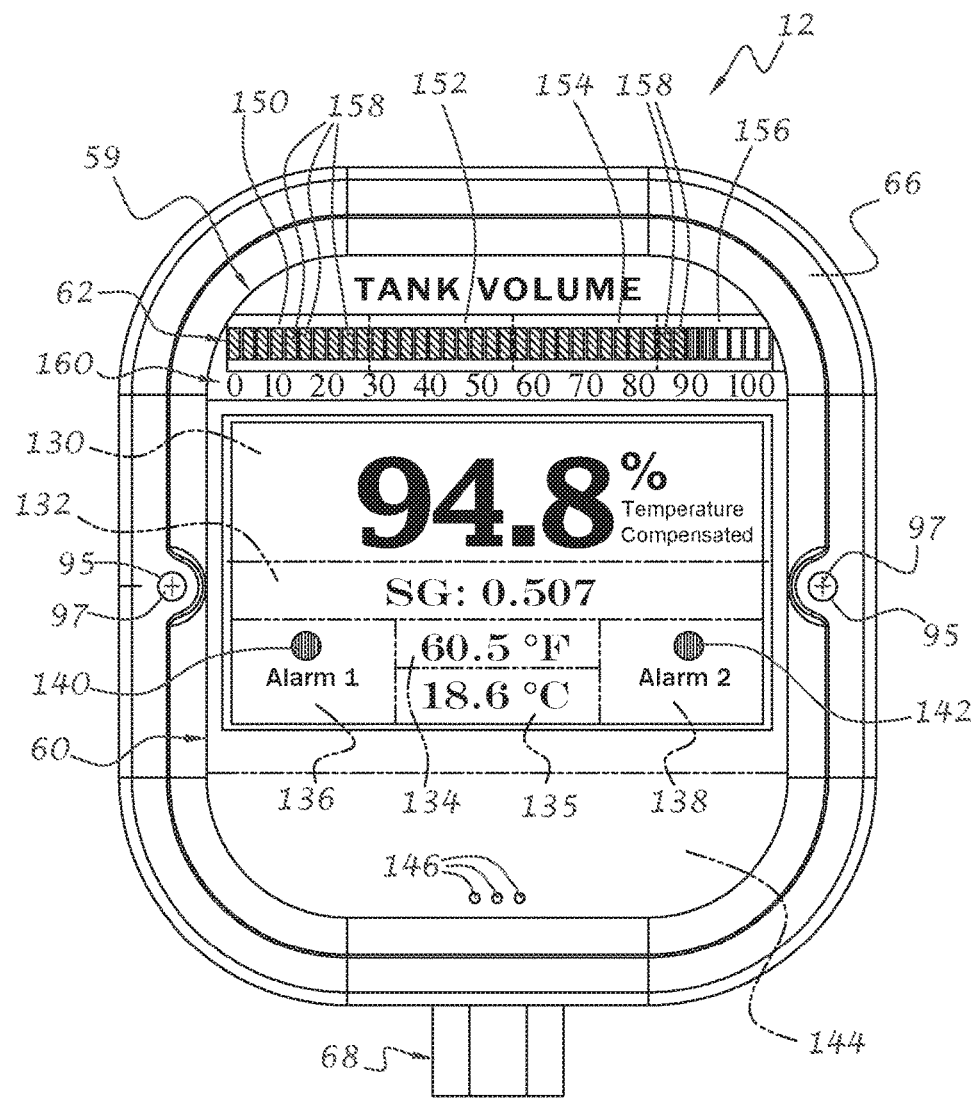
FIG. 3 is an enlarged front elevational view of the electronic gauge assembly of FIG. 1 illustrating exemplary information that can be shown on different display portions associated with the gauge assembly.

Referring to FIGS. 2 and 3, the first display portion 60 preferably comprises electronic display technology such as LCD, LED, or OLED panels, as is well-known, or new technology that may become available. The display portion 60 is divided into display sections for indicating various conditions of the tank 28 (FIG. 1), including a first exemplary display section 130 that shows the level and/or volume of the tank as a temperature-compensated percentage where 0% is an empty tank condition and 100% is a full tank condition. The first section 130 can additionally and/or alternatively display remaining gallons (or liters) of liquid within the tank, the volume of a gaseous phase of the liquid or the vapor content of the tank above the liquid, which is important for pressurized fuels in both liquid and gaseous states such as propane, natural gas, and so on, as well as other information relating to the contents of the tank and/or conditions within the tank. The display of different information may be controlled in the first section 130 by scroll buttons (not shown), the provision of a touch-sensitive display for the first display portion 60 where swiping actions by the user will scroll to different images representing the tank information, as well as control of the display portion 60 remotely via a smart device, as well as other techniques, hardware, and software methods for sequentially displaying different information.

The first display portion 60 also includes a second exemplary display section 132 that shows the specific gravity of the liquid within the tank, as well as other information including ambient temperature, tank temperature, tank pressure, and so on, again through sequential scrolling techniques as discussed above. A third exemplary display section 134 shows the internal tank temperature in Fahrenheit, and alternatively in Celsius, and can additionally or alternatively display the temperature of the gaseous phase and/or liquid phase within the tank, the outside ambient temperature, tank pressure, outside ambient pressure, and so on. A fourth exemplary display section 135 shows tank temperature displayed in Celsius, but may also or alternatively display other information as discussed above. A firth exemplary display section 136 and sixth exemplary display section 138 preferably include a first alarm indicator 140 and a second alarm indicator 142, respectively, which may comprise one or more LED's that illuminate or flash when certain conditions have or are occurring that may be of concern to a user. For example, excessively high or low levels of liquid in the tank, tank pressure that drops below a low threshold or exceeds a high threshold, and so on. Such alarm sections can also be used for indicating that fill or distribution valves are not fully closed or open, or that the vehicle is improperly parked (with the vehicle in neutral or without the emergency brake set for example), as well as other conditions that might be of concern to a user. Such conditions can be more fully displayed in the first and/or second display sections.

A seventh display section 144 can be used for permanently or temporarily displaying a company name, advertisements, instructions and warnings, and so on. The seventh display section can be made by placing or adhering a printed adhesive label on the transparent lens 64 (FIG. 2) or other substrate, and/or by silk-screening such information onto the lens or other substrate. To that end, additional LED's 146 can be provided behind the lens 64 within the seventh display section 144 for back-lighting the printed matter of the seventh display section 142.

It will be understood that more or less display sections can be used and that more or less information can be displayed without departing from the spirit and scope of the invention.

The second display portion 62 preferably comprises a series of bargraph display sections 150, 152, 154, and 156 for example, each bargraph having ten LED segments 158.

Each LED segment represents a predetermined percent of temperature-compensated volume of liquid in the tank. A scale 160 extends along the length of the bargraph display sections for indicating the percent volume by observing the number of LED segments 158 that are illuminated next to the scale 160. As shown in FIG. 3, the cross-hatching of the LED segments up to about 90% represent a green color, meaning that the contents of the tank are at an acceptable volume or level. Likewise, the cross-hatching of the LED segments around 90% and above represent a red LED color, indicating that the contents of the tank are approaching or above an unacceptable volume or level. Since liquid expands with increase in temperature, it is standard practice to fill the tank up to a particular level below completely full to allow for expansion of liquid. The second display portion 62 of the invention, together with the alarm sections of the first display portion 60, ensure that a user is aware of the tank 28 (FIG. 1) being too full, so appropriate action can be taken.

It will be understood that the LED segments can be provided on the PCB 56 (FIG. 2) as a series of individual LED's rather than the bargraph displays. It will be further understood that the colors of the LED segments are not limited to green and red, but can emit light at any color without departing from the spirit and scope of the invention.

Figure 6:
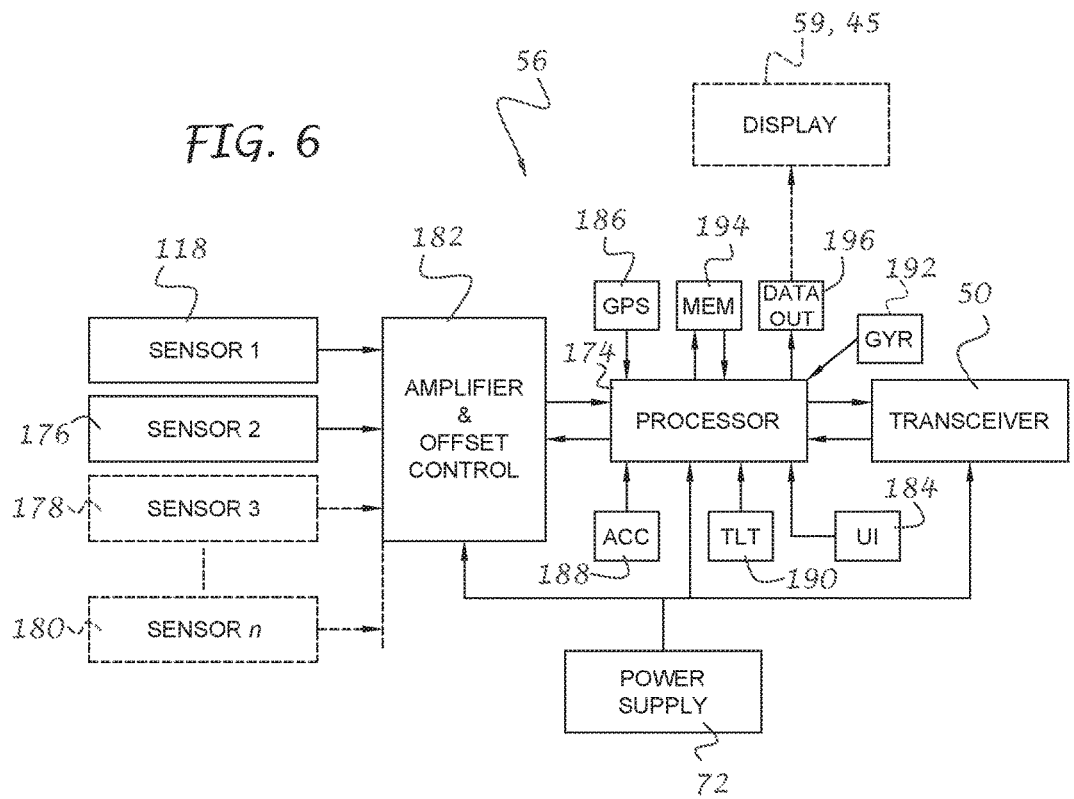
FIG. 6 is a block diagram of electronic components associated with the electronic gauge assembly.
Figure 7:
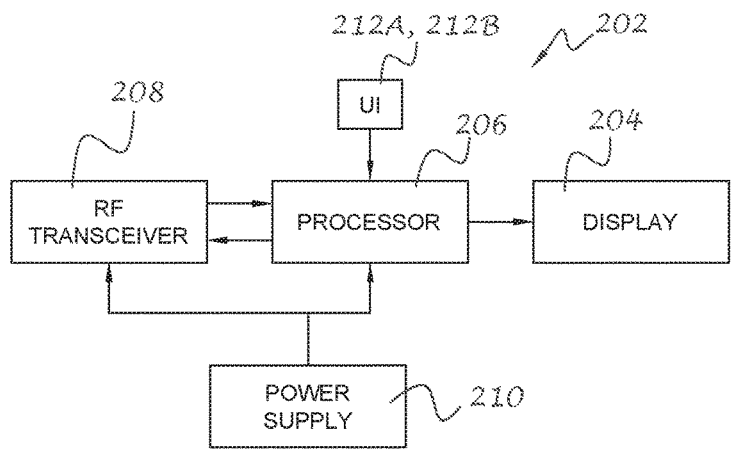
FIG. 7 is a block diagram of electronic components associated with a smart device or the like for receiving information from the electronic gauge assembly and sending information thereto.

With reference now to FIGS. 6 and 7, the electronics assembly 56 for determining various tank and ambient conditions and for driving the display portions 60 and 62 preferably includes a processor a processor 174, the sensor 118 for detecting liquid level (labeled "Sensor 1").

A temperature sensor 176 (labeled "Sensor 2"), such as a thermocouple, thermistor, or silicon bandgap temperature sensor, located in a pocket (not shown) in the tank normally reserved for a mechanical temperature sensor, for measuring the temperature of the liquid inside the tank. The temperature sensor can be used with a look-up table stored in memory to adjust the actual volume of liquid based on the type of liquid in the tank and the temperature of the liquid. For example, propane, iso-Butane, n-Butane, and NH3 will have different temperature compensation factors for the same temperature, with the exception of 60 degrees Fahrenheit, where the actual volume or level of fluid in the tank is at unity for each liquid type as a base reference. Below 60 degrees, each liquid will have a correction factor above unity, which generally increases as the liquid expands under lowering temperatures. Above 60 degrees, each liquid will have a correction factor below unity, which generally decreases as the temperature rises. Accordingly, when displaying temperature-compensated liquid level, a simple math operation is performed with the processor based on the detected temperature and the measured liquid level to obtain actual liquid level.

In accordance with one embodiment of the invention, since many storage tanks are strapped, strapping information for the particular tank associated with the electronic gauge assembly 12 can be uploaded as a strapping table into permanent memory and used to determine tank contents in gallons, liters, and/or other units of volume. Since there are a variety of tank sizes and shapes, strapping information for different tanks would also be different. When the actual volume in gallons or liters is displayed, strapping information relating to tank geometry and the volume of liquid at a particular height with respect to the geometry is also stored in a look-up table for access by the processor. Accordingly, when the processor determines temperature compensated liquid height, the strapping lookup table is accessed by the processor to correlate the temperature-compensated height to with actual volume at that height, thereby obtaining temperature-compensated volume in gallons, liters, or other units of volume. Accordingly, the present invention can display temperature-compensated volume of the liquid within the tank.

A pressure sensor 178 (labeled "Sensor 3") can be provided for measuring the internal pressure of the tank. Other sensors can be provided as well, including sensor 180 (shown in dashed line and labeled "Sensor n") located inside and outside of the tank 28 (FIG. 1) for determining various conditions, such as ambient temperature and pressure outside of the tank, whether or not filling and/or distribution valves are fully closed, and so on. The designation "Sensor n" refers to any number of sensors that can be used to measure different conditions of the tank, the vehicle or system associated with the tank, as well as ambient conditions outside of the tank.

Amplifier and offset control circuitry 182 interfaces between the processor 174 and sensors 118, 176, 178, 180, and so on, for conditioning the signals from the sensors prior to being received and processed within the processor. It will be understood that the amplifier and offset control circuitry 182 may alternatively form part of the processor software or may be eliminated without departing from the spirit and scope of the invention.

A radio frequency (RF) transceiver 50 is also connected to the processor 74 for sending signals to the display 45 (FIG. 1) of the smart device or remote display unit 46 for displaying various measurement data from the sensors 118, 176, 178, 180, as well as other sensors, as will be described. The RF transceiver 50 can also receive signals from the remote smart device 46 for initiating various functions such as remotely turning on and off the display portions 60 and 62, verifying the receipt of transmitted information, loading software updates to the electronic gauge assembly 12, and so on.

In accordance with a preferred embodiment of the invention, the RF transceiver comprises a Bluetooth low energy (BLE) module for communicating with smart devices via the same protocol, which may in turn be connected to the Internet via Wi-Fi, so that one or multiple electronic gauge assemblies can be monitored, updated, calibrated, and effect the electronic transfer of tank information remotely via the Internet on any device with a compatible platform. In accordance with a further embodiment of the invention, the RF transceiver comprises a Wi-Fi device capable of directly communicating with the Internet for remotely accomplishing the above-described functions. In this embodiment, the RF transceiver broadcasts over Wi-Fi frequencies and also has a dedicated modem or other device for accessing 3G, 4G or other cellular networks for access to the Internet when such services are not readily available. It is contemplated that other RF transceivers can be used with a variety of different carrier frequencies, such as radio bands with 433.92 MHz, 915 MHz, and 2400 MHz frequencies, short range devices at 315 MHz and 868 MHz frequencies, as well as defined protocol communications via ZigBee™, Bluetooth low energy (BLE), and Wi-Fi, at 2.4 Ghz, 3.6 Ghz, and/or 5 Ghz, or any other suitable protocol.

The RF transceiver 50 is preferably located at a position on the PCB 56 (FIG. 2) that minimizes RF interference and maximizes the distance or range over which the signals can be transmitted. A user input, such as one or more push-button switches 184 (FIG. 6), can be mounted on the PCB 56 for manipulation by a user to selectively turn on and off the displays, scroll through different information on the displays, as well as other functions, including but not limited to, entering a learn mode to couple the electronic gauge assembly 12 with a particular smart device 46 (FIG. 1), entering a calibration routine or other functions relating to the contents of the tank, and so on. The transceiver 50 can also receive signals from the remote smart device 46 for initiating various functions, as previously described. By way of example, the low energy Bluetooth connection between the smart device and the electronic gauge assembly includes a platform-specific application (app) on the smart device for configuring the electronic gauge assembly including the display portions 60 and 62. Thus, the user is able to input key setup parameters for the gauge including, but not limited to: entering the specific gravity of the liquid in the tank, selection of preferred temperature units: ° C. or ° F., Alarm 1 on/off selection, Alarm 2 on/off selection, Alarm 1 trigger percentage, Alarm 1 trigger slope (increasing level or decreasing level), Alarm 1 delay, e.g. a predetermined time period, such as 30 seconds for example only, that the alarm condition has been met prior to activating the alarm, Alarm 2 trigger percentage, Alarm 2 trigger slope (increasing level or decreasing level), Alarm 2 delay (similar to Alarm 1 delay, the tank geometry specific data, tank Level—both uncompensated and temperature compensated level should be provided via the BLE link, tank temperature should be provided via BLE link in the desired units, turning on and off advertising information on the display. This feature is to allow advertisements to be displayed on the bobtail while traveling for example, so that other drivers may be exposed to advertising, which may be an additional source of revenue for companies and individuals using the electronic gauge assembly.

A GPS unit 186 can also be provided to determine instantaneous velocity as well as the location of the vehicle at all times. This information can be relayed to the remote smart device 46 and/or a remote location for monitoring by a control station or the like for determining the location of a fleet of bobtails or the like. The GPS unit can also be useful for alerting a driver when, based upon the calculated remaining gallons of liquid, whether the driver can continue with a refilling route or return to the base station for filling the storage tank.

A three-axis accelerometer 188 can also be provided to determine acceleration, deceleration, instantaneous velocity, centrifugal forces experienced while turning through curved sections of a roadway, and so on. Data from the accelerometer can be used to determine actual liquid level despite changes in the upper surface of the liquid due to acceleration forces to ensure that a steady level or volume of fluid is displayed.

A three-axis tilt sensor 190 is preferably provided for determining whether the vehicle, and thus the tank, is on a sloped surface, both lengthwise and width-wise, which would effectively change the plane of the liquid upper surface with respect to a sensor that uses the upper surface to determine liquid level or volume. With the angle of the slope being known, as well as the geometry of the tank, the processor 174 can be used to calculate actual level so that errors in displaying incorrect liquid level or volume are minimized.

A three-axis gyroscope 192 can also be provided to the upper surface of the liquid with respect to the tank, as the upper surface will always be perpendicular to a gravitational force vector, while the vehicle and tank may not. Accordingly, the gyroscope 192 is useful for ensuring that actual tank volume or level is displayed. Although the accelerometer, tilt sensor and gyroscope are shown as separate units in FIG. 6, it will be understood that a 9-axis accelerometer/ gyroscope/tilt sensor can be used. Such devices are widely available at relatively low cost and can be interfaced with the processor 174 for calibrating the liquid level and/or volume of liquid in the tank with practically any scenario to ensure accurate display of the tank condition, whether the tank and its contents are stationary or moving, whether on flat or sloped surfaces, and so on. The data gathered from the various sensors can be stored in a memory 194 associated with the processor 174 and a data output interface 196 can be provided in order to store, process and display the recorded data on a display, such as display portions 60 and 62 (shown in broken line), as previously described.

The real-time compensation process associated with ensuring accurate liquid level and/or liquid volume within the tank can be gathered and processed through known data processing techniques using computer algorithms or software for various platforms and can be provided as computer readable software on various media storage devices for downloading into and operating on a smartphone, a computer, display, or the like, including but not limited to, hard drives, Internet websites, thumb drives, flash memory devices, CD's, and so on.

In accordance with a further feature of the invention, with the above-described electronics and software implementation both embedded in the electronic gauge assembly 12 and the user-specific app on the smart device, the calculation of vapor content within the tank 28 is possible. To do so, the processor accesses the strapping information of the particular tank of interest where tank geometry is correlated to liquid height and volume, as well as tank pressure information from the pressure sensor 178 (FIG. 6), the volume of the vapor space above the liquid can be calculated. This is especially advantageous for liquids such as propane.

By way of example, if it is known that the tank 28 has a 10,000-gallon water capacity, and the temperature-compensated level reading is calculated at 75% full, and the tank pressure is 100 psig, the processor 174 (FIG. 6) accesses a vapor space lookup table where gauge pressure is correlated to gallons (or other volume units) for the vapor space. A simple mathematical operation is performed by the processor by multiplying the gallons or other unit located on the lookup table by the water capacity of the tank. For the present example, for 100 psig tank pressure, the value in the lookup table is 0.0287 gallon. The mathematical function would therefore be multiplying gallons from the lookup table by the water capacity, e.g. 0.0287×10,000=287. Since the vapor space is equal to 25% of the total volume (since the temperature-compensated liquid level was calculated at 75% in the example above), the processor multiplies gallons by the vapor space, for example, 287 gallons×25%=72 gallons of vapor space. The following vapor lookup table for propane is given by way of example only, and is based on typical value of 36.39 cubic feet of gas to one gallon of LPG:

| Gauge Pressure | Gallons |
| --- | --- |
| 200 | .0537 |
| 150 | .0412 |
| 100 | .0287 |
| 50 | .0162 |
| 10 | .0062 |
| 0 | .0037 |

In accordance with a further embodiment of the invention, a separate pressure sensor may not be needed as the processor can calculate the tank pressure with the following lookup table correlating propane temperature with pressure:

| ° F. | PSIG |
|---|---|
| −20 | 13.5 |
| 0 | 28 |
| 20 | 47 |
| 40 | 72 |
| 60 | 102 |
| 80 | 140 |
| 100 | 196 |

Having a more complete picture of the amount of propane in the tank (in both liquid and vapor phases) is advantageous to the user, as the vapor phase of propane and similar fuels is most often used to run propane-powered vehicles and equipment.

It will be understood that the various measured and calculated parameters as described above are given by way of example only and are not intended to be an exhaustive list. Software techniques and methods for accurately determining the liquid level, volume and other tank conditions as discussed above can be implemented in digital electronic circuitry, or in computer hardware, firmware, software, or combinations thereof. Apparatus may be implemented in a computer program product tangibly embodied in a machine-readable storage device for execution by a programmable processor; and the above-described methods may be performed by a programmable processor executing a program of instructions to perform functions by operating on input data and generating output. Further embodiments may advantageously be implemented in one or more computer programs that are executable on a programmable system including at least one programmable processor coupled to receive data and instructions from and transmit data and instructions to a data storage system, at least one input device, and at least one output device. Each computer program may be implemented in a high level procedural or object-oriented programming language, or in assembly or machine language, which can be compiled or interpreted. Suitable processors include, by way of example, both general and special purpose microprocessors. Generally, a processor receives instructions and data from read-only memory and or RAM. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and so on. Any of the foregoing may be supplemented by, or incorporated in, specially designed application specific integrated circuits (ASIC's).

Figure 8:
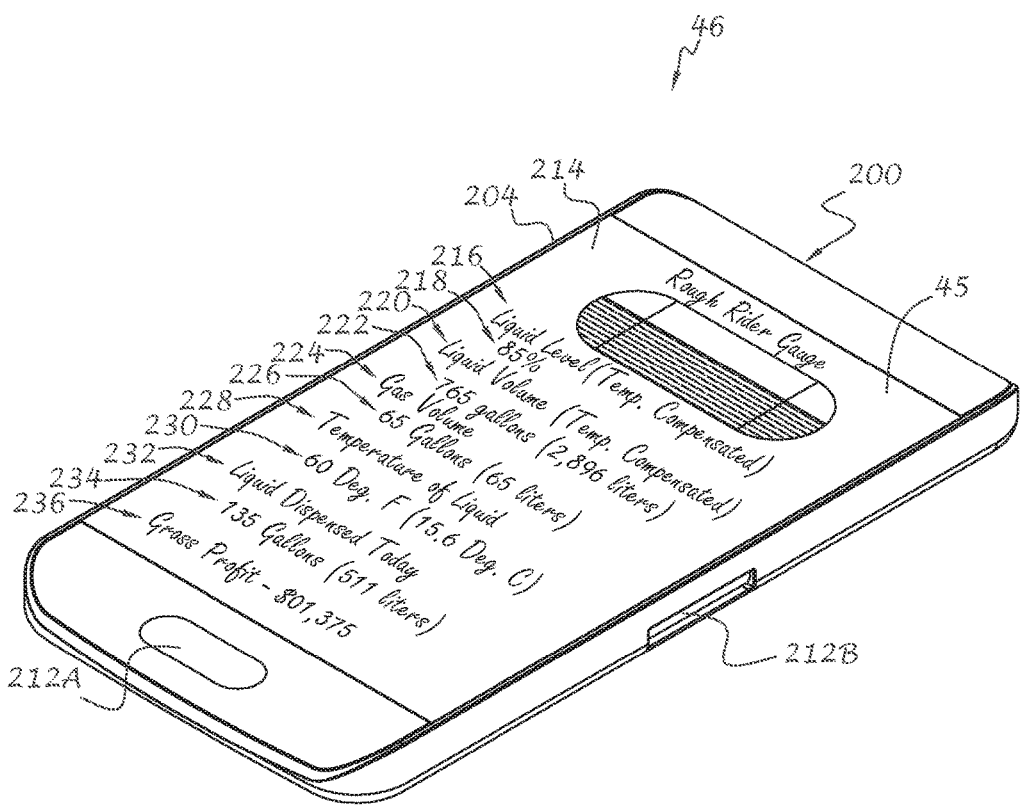
FIG. 8 is a top isometric view of a smart device for wireless communication with the electronic gauge head assembly and illustrating exemplary information that can be shown for the storage tank and its contents.

Referring to FIGS. 7 and 8, the remote smart device 46 is preferably embodied as a smartphone or tablet that can communicate via Bluetooth™ technology and/or other wireless frequencies with the electronic gauge assembly 12 via a user-specific application (app) downloaded onto the smart device. The smart device 46 includes a housing 200 (FIG. 8) that encloses an electronics section 202 (FIG. 7). A window 204 is formed in the housing 200 for exposing the touch-screen display 45, that is in turn connected to a processor 206. A RF transceiver 208, such as a BLE for example, is preferably connected to the processor 206 for receiving measurement signals from the electronic gauge assembly 12 and transmitting information related to tank geometry including strapping information and look-up tables as previously described, information for the particular liquid to be measured in the tank, program updates and instructions to the gauge assembly as previously described. A power supply 210 is connected to the processor 206 and transceiver 208. The power supply comprises one or more batteries so that the smart device 46 has portability. A user input, such as push-button switch 212A, 212B, extend from the housing 200 for manipulation by a user, together with the touch-screen 45, to selectively turn on and off the display 45 and/or 59 of the gauge assembly 12, as well as to select other functions, including but not limited to, wirelessly coupling with the electronic gauge assembly 12, selecting information to be displayed on both devices, selecting information to be transmitted to the electronic gauge assembly related to tank geometry, liquid properties, look-up tables, and so on, for use by the processor 174.

The provision of a remote display that can be carried by a user, as shown in FIG. 1, is especially advantageous over prior art solutions that require the user to be at the rear or side of the tank to determine the amount of liquid within the tank. This is especially true of bobtails or other tanker trucks where the only liquid level gauge is located at the rear of the tank. Such prior art gauges are mechanical in nature and have many disadvantages when compared to the present invention, since communication of tank information to a more convenient and possibly safe location is enabled, along with liquid level or volume information that is both temperature compensated and calibrated for tilt and acceleration/deceleration forces. Such a provision also allows a user to constantly monitor tank contents and other parameters during transportation along roads that have steep upward or downward grades, curves, and other instances where acceleration and/or gravitational forces may have an incorrect influence on the measurement of liquid level and/or liquid volume within the tank. Moreover, such a provision also allows information wirelessly transmitted to the electronic gauge assembly to be completely controlled by the smart device. This allows the end user to customize the gauge assembly and accompanying display for a specific tank, liquid to be measured, and type of sensing probe used to measure the liquid level.

As shown in FIG. 8 for example, some of the information with can be displayed on the smart device 46 (and also transmitted to the electronic display 60) is a graphical image of liquid level 214, a "Liquid Level (Temp. Compensated) label 216 followed by a numeric display of the percent liquid level or volume 218. A label and numerical value for the number of gallons (or liters) remaining in the tank are displayed at 220 and 222. Likewise, a label and value for vapor volume remaining in the tank, as calculated, are displayed at 224 and 226. At 228 and 230, a label and actual value for the temperature of the liquid in the tank are displayed. AT 232 and 234, a label and numeric value for the total amount of liquid dispensed from the vehicle during the day, are displayed. At 236, a gross profit for the day's deliveries is displayed. Of course, it will be understood that the above information is given by way of example only and the actual information can vary depending on the particular requirements of a particular tank, the properties of a particular liquid or liquids to be measured, and the particular level sensing probe being used.

Referring now to FIGS. 9-13, the sensing probe assembly 15 is shown connected to the electronic gauge assembly 12. Although a particular sensing probe and its mounting arrangement with the electronic gauge assembly 12 will be shown and described, it will be understood that the electronic gauge assembly of the present invention can be used with any float-type liquid level transducer or any solid-state liquid level transducer where liquid level signals can be transmitted to the electronic gauge assembly 12 in practically any application and/or location where indication of liquid level is desirous. Accordingly, it is anticipated that the electronic gauge assembly 12 can be used with capacitance-type liquid level probes, reed switch-type probes, and so on.

The sensing probe assembly 15 includes a gauge head 240 with a mounting base 242 adapted for mounting on the wall 243 (FIG. 13) of the tank 28 (FIG. 1). The electronic gauge assembly 12 is connected to the mounting base 242 via a pair of brackets 244 and 246 that are located between the mounting base 242 and the rear wall 74 of the rear housing 52 of the electronic gauge assembly 12. The mounting base 242 is shown as generally circular in shape and includes apertures 248 that align with apertures 250 formed in the tank wall 243. Fasteners (not shown) extend through the apertures for connecting the mounting base 242 to the wall. Instead of apertures in the tank wall, threaded studs may extend through the tall for engaging the apertures 248 of the mounting base 242 in a known manner for connecting the components together.

The sensing probe assembly 15 also includes a tubular support member 320 that extends downwardly from the gauge head 240 and houses the driven shaft 122 (FIGS. 5, 12 and 13) that in turn rotates a magnet 120 (FIG. 5) or other actuator for detection by a magnetic field sensor 118 or the like, as previously described. The tubular support member 320 and driven shaft 122 can be provided in different lengths to accommodate a wide variety of different tank depths.

Figure 9:
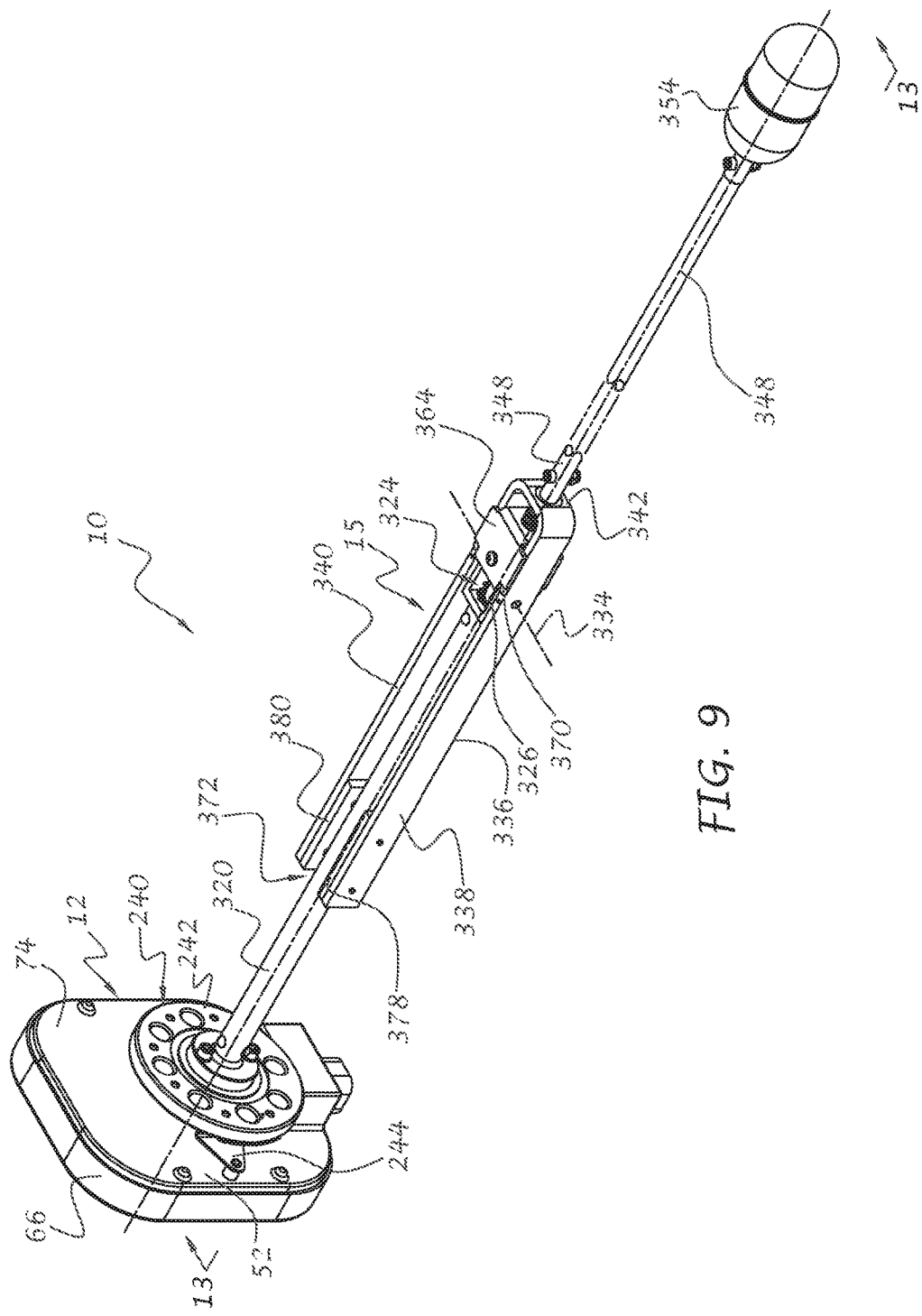
FIG. 9 is a rear isometric view of the liquid level transducer including a tank mounting head connected to the electronic gauge assembly and sensing probe assembly.
Figure 10:
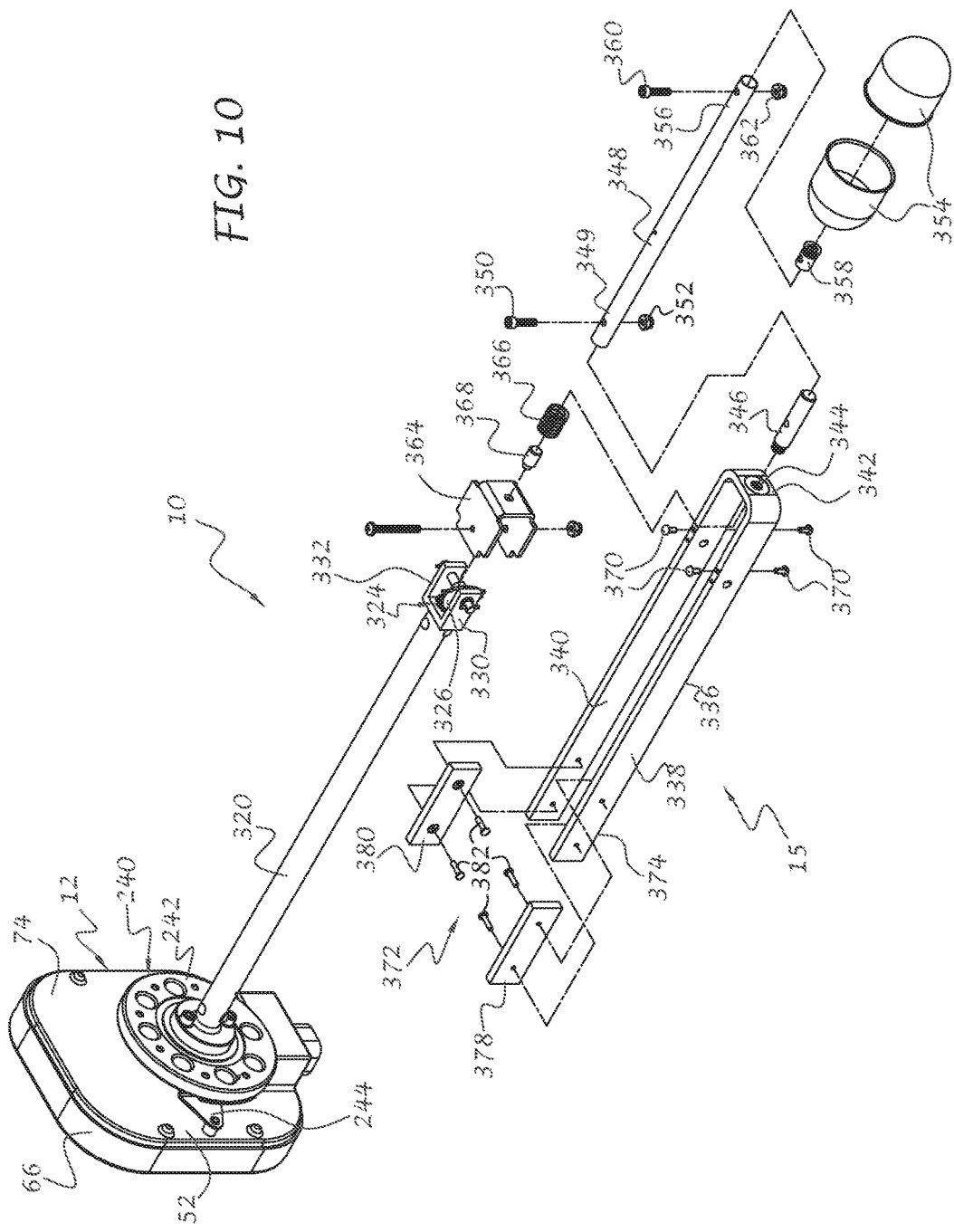
FIG. 10 is a rear isometric exploded view of the sensing probe assembly of the liquid level transducer of FIG. 9.
Figure 13:
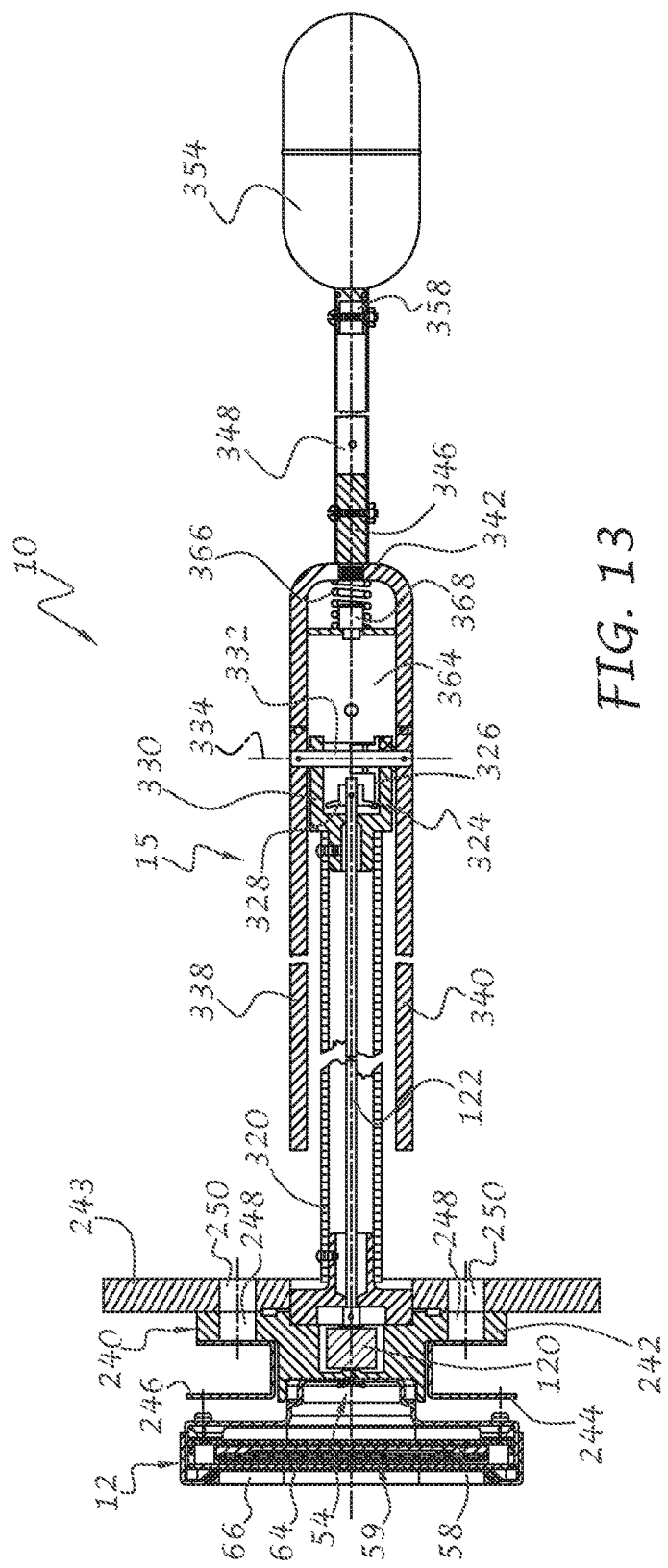
FIG. 13 is a longitudinal sectional view of the liquid level transducer taken along line 13-13 of FIG. 9.

A gear assembly 324 is located at a lower end of the tubular member 320 and includes a driving gear 326 rotatably connected to an inner yoke 330 (FIG. 10) and a driven gear 328 connected to the driven shaft 122 for rotation therewith. The driving gear 326 and driven gear 328 are coupled together such that rotational movement of the driving gear results in proportional rotational movement of the driven gear 328 and thus rotation of the shaft 122 to ultimately drive the display portions 60 and 62 (FIG. 3). The inner yoke 330 is connected to the lower end of the tubular member 320. The driving gear 326 is rotatably connected to the inner yoke 330 via a pivot pin 332 (FIG. 12) that extends through the driving gear 326 and inner yoke 330. The driving gear 326 is preferably fixedly connected to the pivot pin which is in turn rotatably connected to the inner yoke 330 about a pivot axis 334 (FIG. 9).

An outer yoke 336 includes a pair of arms 338, 340 that are fixedly connected to the pivot pin 332 for rotation therewith about the pivot axis 334. A cross member 342 extends between the arms 338, 340 and includes a threaded opening 344 (FIG. 10) for receiving the threaded end of an insert 346. A float rod 348 has a proximal end 349 that is received over the insert and secured thereto with a bolt 350 that extends through the float rod 348 and insert 346. A nut 352 is received on the end of the bolt 350 to thereby securely connect the float rod 348 to the outer yoke 336. The float rod 348 can be provided in different lengths to accommodate a wide variety of different tank sizes and configurations.

A float 354 is connected to a distal end 356 of the float rod 348 via an insert 358 that is connected to the float and received in the distal end 356 of the float rod. A bolt 360 extends through the float rod 348 and insert 358 and a nut 362 is received on the end of the bolt 360 to thereby securely connect the float 354 to the float rod 348. The float 354 can be provided in different lengths, widths, shapes, configurations, materials, densities, can be solid or hollow, and so on, to accommodate a wide variety of different liquids to be measured.

A U-shaped bracket 364 fits within the outer yoke 336 and is biased toward the gear assembly 324 by a compression spring 366 located between the cross member 342 and the bracket 364. A spring guide 368 is connected to the bracket 364 and extends into the spring 366. Stop members 370 are preferably mounted on the arms 338, 340 to limit bracket travel toward the gear assembly.

A counterweight assembly 372 is preferably connected to a distal end 374 of the outer yoke 336. The counterweight assembly 372 includes a first weight portion 378 connected to the yoke arm 338 and a second weight portion 380 connected to the yoke arm 340 via fasteners 382, such as rivets. However, it will be understood that one or both weight portions can be connected to the arms 338, 340 via threaded fasteners, clamps, welding, adhesive bonding, and other connection means, as well as being integrally formed or machined with the yoke arms, without departing from the spirit and scope of the invention. It will be further understood that a single weight portion can be used or both weight portions can be eliminated when the arms 338, 340 are sufficiently heavy to counteract the forces applied by the float and float rod. In addition, it will be understood that one of the yoke arms can be eliminated if a single yoke arm and/or weight are sufficient to counteract the float and float rod forces.

Although a particular embodiment for the sensing probe assembly 15 has been shown and described, it will be understood that other mounting arrangements as well as other sensing probe configurations can be used without departing from the spirit and scope of the invention. For example, a one-inch NPT threaded mounting opening is common on many types of holding tanks and therefore it is within the purview of the present invention to provide appropriate mounting heads for any tank mounting configuration for connecting the electronic gauge assembly and the sensing probe assembly to the tank wall.

Moreover, it will be understood that other sensing probes can be used in conjunction with the electronic gauge assembly of the invention, including but not limited to spiral rods that rotate upon linear float movement, float rods that rotate with the driven shaft as set forth for example in U.S. application Ser. No. 15/490,881 to Herbert G. Ross, Jr. filed on Apr. 18, 2017, the disclosure of which is hereby incorporated by reference, as well as stationary sensing probes that use reed switches, capacitance, resistance, time domain reflectometry, heated wire or plate technology, and so on, without departing from the spirit and scope of the invention. Another suitable exemplary liquid level sensing probe is disclosed in U.S. Pat. No. 5,357,815 assigned to Rochester Gauges, Inc., the disclosure of which is hereby incorporated by reference. Details of another suitable sensing probe can be found in U.S. Pat. No. 6,041,650 assigned to Rochester Gauges, Inc., the disclosure of which is hereby incorporated by reference. Accordingly, it will be understood that other sensing probes can be used with the electronic gauge assembly of the present invention without departing from the spirit and scope thereof.

It will be understood that the term "preferably" as used throughout the specification refers to one or more exemplary embodiments of the invention and therefore is not to be interpreted in any limiting sense.

It will be further understood that the term "connect" and its derivatives refers to two or more parts capable of being attached together either directly or indirectly through one or more intermediate members. In addition, terms of orientation and/or position as may be used throughout the specification denote relative, rather than absolute orientations and/or positions.

It will be appreciated by those skilled in the art that changes could be made to the embodiments described above without departing from the broad inventive concept thereof. For example, a single unitary bracket member incorporating the plates and angles of the separate right and left brackets can be provided without departing from the spirit and scope of the present invention. It will be understood, therefore, that this invention is not limited to the particular embodiments disclosed, but is intended to cover modifications within the spirit and scope of the present invention as defined by the appended claims.

What is claimed is:

1. An electronic gauge assembly for indicating liquid condition within a tank, the gauge assembly being operatively connectable to a liquid level sensor probe, and comprising:
    a mounting base adapted for connection to the tank;
    a housing connected to the mounting base;
    an electronics assembly located in the housing and comprising:
        a first electronic display located in the housing and having a first display portion for displaying a liquid level condition within the tank;
        a first electronic sensor connected to the housing, the first electronic sensor being couplable to the liquid level sensor probe such that a change in the liquid level sensor probe due to a change in liquid level causes a change in an electronic state of the first electronic sensor;
        a first processor in communication with the first electronic sensor and the first electronic display for determining and displaying the liquid level condition; and
        a first RF transceiver associated with the first processor for wirelessly transmitting information associated with the tank to a portable smart device operable by a user, and for wirelessly receiving information from the portable smart device for controlling display information on the first electronic display, the portable smart device having a second processor, a second electronic display, and a second RF transceiver for communication with the first RF transceiver and first processor; and
    a user-specific application program downloadable onto the portable smart device, the user-specific application program comprising:
        first user selectable information related to different tank geometries;
        second user selectable information related to at least one property of different liquids to be measured;
        means for selecting the first information and the second information by the user; and
        means for transmitting, via the second and first transceivers, respectively, the first and second information to the electronic gauge assembly for remotely customizing the appearance of the first electronic display, including displaying, on the first electronic display, the first liquid level condition of the tank based on:
            a) the electronic state of the first electronic sensor;
            b) the first information related to the tank geometry selected by the user of the portable smart device; and
            c) the second information related to the at least one property of the liquid to be measured selected by the user of the portable smart device.

2. The electronic gauge assembly according to claim 1, and further comprising a second electronic sensor for detecting a temperature of the liquid within the tank, the second electronic sensor being in communication with the first processor;
    wherein the first processor includes means for calculating a second temperature-compensated liquid level condition based on the first liquid level condition and the temperature of the liquid, and sending signals representing the second liquid level condition to the first display portion for displaying the temperature-compensated liquid level condition.

3. The electronic gauge assembly according to claim 2, wherein the first electronic display comprises a second display portion for displaying the temperature-compensated liquid level condition.

4. The electronic gauge assembly according to claim 3, wherein the first display portion comprises a display panel having a first display section for showing the temperature-compensated liquid level as a percent of a full tank condition.

5. The electronic gauge assembly according to claim 4, wherein the second display portion comprises an illuminated bargraph display with individual sources of light and a scale extending along the bargraph display, the scale including indicators for liquid level as a percent of a full tank condition, wherein the individual sources of light of the bargraph display are illuminated along the scale until the indicator representative of the calculated temperature-compensated liquid level is reached.

6. The electronic gauge assembly according to claim 5, wherein the first display portion comprises:
    further display sections for displaying specific gravity of the liquid in the tank based on specific gravity information of a particular liquid to be measured in the tank as selected by a user in the application specific program on the portable smart device and transmitted to the first processor via the second and first RF transceivers, respectively, as well as the temperature of the liquid in the tank; and
    at least one alarm condition that is automatically actuated by at least one of a plurality of events comprising a sloped or tilted tank condition, high or low levels of liquid in the tank, tank pressure that drops below a low threshold or exceeds a high threshold, the vehicle being improperly parked, or indicating that fill or distribution valves are not fully open or closed.

7. The electronic gauge assembly according to claim 1, wherein the liquid level sensor probe comprises a shaft, a magnet connected to a first end of the shaft, a float rod connected to a second end of the shaft for rotating the shaft and magnet about a longitudinal axis upon pivotal movement of the float rod, and a float connected to the float rod for floating on a surface of the liquid, wherein movement of the float due to a change in liquid level causes pivoting movement of the float rod and rotational movement of the shaft and magnet;
    wherein the first sensor comprises a magnetic field sensor for detecting rotational movement of the magnet.

8. The electronic gauge assembly according to claim 1, wherein the second information associated with the user-specific application program comprises specific gravity information for each liquid, wherein the specific gravity information is selectable by the user and wirelessly transmitting to the first processor via the second and first transceivers, respectively, to thereby determine and display, on the first electronic display, an actual volume of liquid in the tank based on the specific gravity of the liquid for affecting the appearance of the electronic display.

9. The electronic gauge assembly according to claim 8, wherein the first user-selectable information includes a first look-up table correlating liquid height in the tank to liquid volume for the particular tank geometry to thereby display a volume of liquid on at least the first electronic display.

10. The electronic gauge assembly according to claim 9, wherein the second user-selectable information further comprises a second look-up table correlating liquid volume and temperature so that temperature-compensated liquid volume of the tank can be calculated by the processor and displayed on at least the first electronic display.

11. The electronic gauge assembly according to claim 10, and further comprising:
a pressure sensor in communication with the processor for sensing a pressure inside the tank; and,
third user-selectable information associated with the user-specific application program comprising a third look-up table correlating liquid volume, liquid height, and tank pressure to thereby calculate a temperature-compensated vapor space in the tank above the liquid level and display the vapor space on at least one of the first and second electronic displays.

12. The electronic gauge assembly according to claim 1, wherein the first display portion comprises a display panel having a first display section for showing the liquid level as a percent of a full tank condition.

13. The electronic gauge assembly according to claim 1, wherein the second display portion comprises an illuminated bargraph display with individual sources of light and a scale extending along the bargraph display, the scale including indicators for liquid level as a percent of a full tank condition, wherein the individual sources of light of the bargraph display are illuminated along the scale until the indicator representative of the calculated temperature-compensated liquid level is reached.

14. A method of measuring and displaying liquid condition within a tank, the method comprising:
providing an electronic gauge assembly having a mounting base adapted for connection to the tank, a housing connected to the mounting base, a processor in communication with a memory, an electronic display, a first sensor for sensing liquid level and a second sensor for sensing temperature of the liquid;
providing a user-specific application program that is downloadable to a remote smart device to be carried by a user, the user-specific application program including user-selectable first information related to a plurality of different tanks with different tank geometries and related volumes of liquid at any given liquid height for each tank geometry, and user-selectable second information related to at least one property of at least one liquid of a plurality of different liquids that may be located within the tank;
providing a RF transceiver wirelessly transmitting a user-selected tank geometry and related volume of liquid of the first information and the at least one user-selected liquid property of the at least one liquid of the second information to the electronic gauge assembly;
storing the user-selected tank geometry and related volume of liquid and the at least one user-selected liquid property of the at least one liquid in the memory;
automatically customizing the electronic gauge assembly, including the electronic display, with the user-selected information by:
determining a liquid level condition of the tank with the first sensor;
determining a temperature of the liquid within the tank with the second sensor;
calculating, with the processor, a temperature-corrected liquid level condition of the tank by correlating the first information stored in the memory related to the user-selected tank geometry and volume of liquid at any given liquid height, and correlating the second information stored in the memory related to the at least one user-selected liquid property of the at least one liquid stored in the tank; and
displaying at least one of temperature-corrected liquid level and temperature-corrected liquid volume on the electronic display for the user-selected tank geometry and the at least one user-selected liquid property of the at least one liquid stored in the tank.

15. The method according to claim 14, wherein the first information associated with the user-specific application program comprises at least a first lookup table correlating liquid height in the tank to liquid volume for the user-selected tank geometry; and
calculating liquid volume within the tank based on the liquid level within the tank as detected by the first sensor, for wirelessly controlling at the first information loaded into the memory of the electronic gauge assembly and the first information displayed on the electronic display.

16. The method according to claim 15, wherein the second information associated with the user-specific application program further comprises a second look-up table having specific gravity information of the user-selected at least one liquid for correlating liquid volume and temperature;
wirelessly transmitting the second look-up table to the electronic gauge assembly;
calculating, with the processor, the temperature-compensated liquid volume of the tank; and
displaying the temperature-compensated liquid volume of the tank on the electronic display.

17. The method according to claim 16, and further comprising:
sensing a pressure inside the tank; and,
wherein the user-specific application program includes third information having a third look-up table correlating liquid volume, liquid height, and tank pressure for each of the plurality of liquids;
wirelessly transmitting the third look-up table associated with the user-selected at least one liquid to the electronic gauge assembly;
calculating, with the processor, a temperature-compensated vapor space in the tank; and
displaying the temperature-compensated vapor space.

18. The method according to claim 14, wherein the step of automatically customizing the electronic gauge assembly further comprises operating the user-specific application program to wirelessly load software updates to the electronic gauge assembly.

19. The method according to claim 14, wherein the step of automatically customizing the electronic gauge assembly further comprises operating the user-specific application program to remotely turn on and off one or more portions of the electronic display.

* * * * *